Patented Feb. 13, 1951

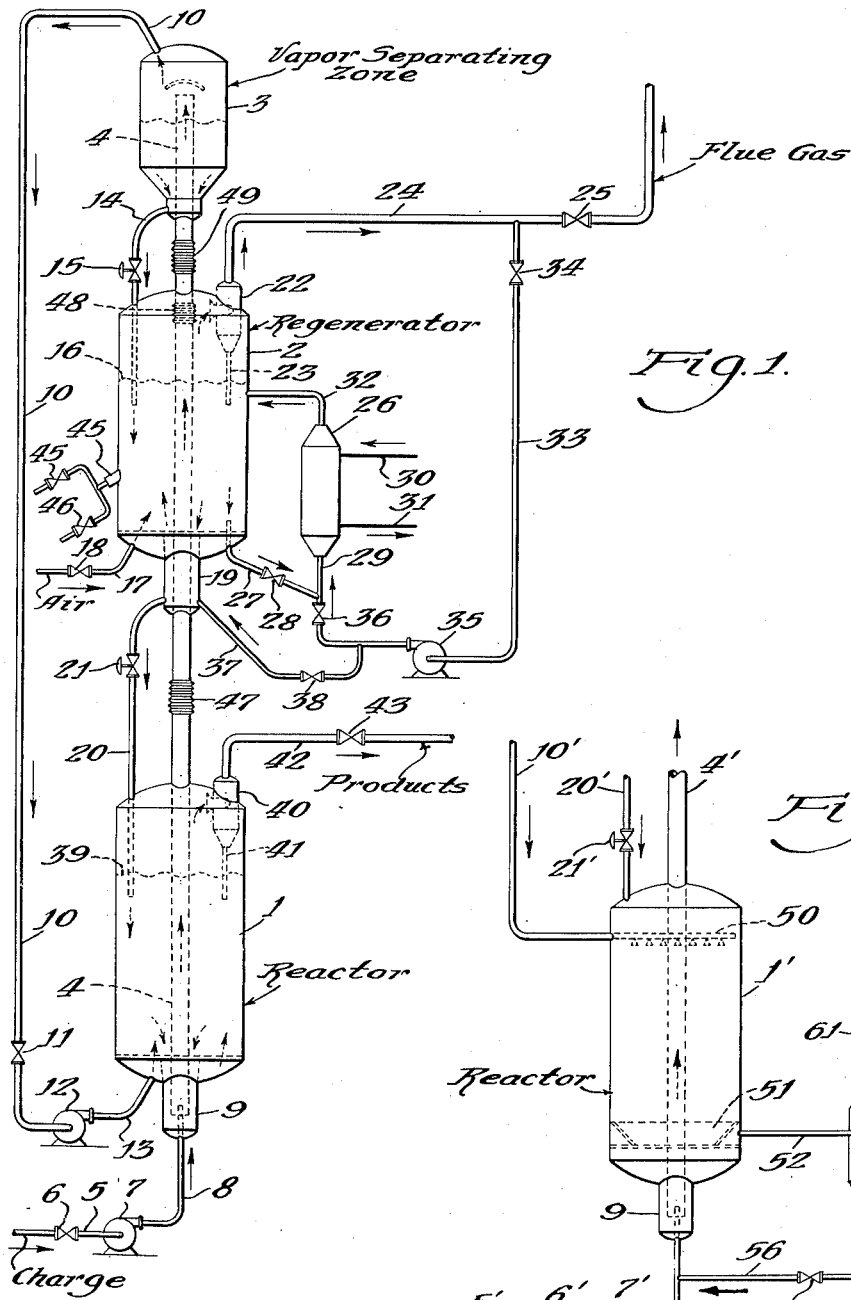

2,541,077

UNITED STATES PATENT OFFICE 2,541,077

METHOD AND APPARATUS FOR CONTACTING SUBDIVIDED SOLID PARTICLES WITH A FLUID REACTANT STREAM

Frederick W. Leffer, Riverside, Ill., assignor to Universal Oil Products Company, Chicago, Ill., a corporation of Delaware Application January 29, 1949, Serial No. 73,616

18 Claims. (Cl. 196—52)

1

This invention relates to an improved method and apparatus for contacting sub-divided solid particles with a fluid reactant stream in two stages and effecting conversion of the reactant to more valuable products in at least the second one of these stages. More specifically, the process is directed to the conversion, either thermally or catalytically, of heavy hydrocarbon oils in the presence of a finely divided solid material in a manner providing a two-stage contact between the oil stream and the solid material, oil charged in the liquid phase being subjected to vaporization in the initial contact with solid material obtained at an elevated temperature from a second contact stage, and resulting vapors being subjected in the separate second stage to contact with reconditioned, more highly heated or reactivated solid material.

Although the present contacting arrangement is particularly advantageous for carrying out the catalytic cracking of a heavy hydrocarbon charge with a silica alumina, silica magnesia, or other desirable catalyst, it is not intended to limit the flow to that particular operation, for it is realized that the invention can be applied advantageously also to the conversion of other organic reactants in the presence of solid catalyst particles, wherein a carbonaceous deposit is made on the solid material followed by treatment of the latter in a regenerating zone suitable to effect a substantially complete removal of the contaminants and regeneration of the catalyst. Such catalytic conversions, by way of example, include: vapor-phase dehydration of aliphatic alcohols to olefins in the presence of catalytic composites of silica with one or more of the compounds alumina, zirconia, thoria and blue oxide of tungsten; manufacture of ketones from the lower organic acids using a synthetic silica-alumina catalyst; conversion of alcohols with steam into ketones over silica-thoria catalyst; and production of aliphatic amines by reaction of the corresponding alcohol vapor with ammonia in the presence of a silica-alumina catalyst. The improved operation may also be adapted to effect a thermal conversion of a fluid reactant stream with the aid of a particulated substantially inert heat carrying material, such as for example, the reaction of hydrocarbons with gaseous sulfur compounds to form carbon disulfide, the formation of olefinic or acetylenic gases from higher boiling or more saturated hydrocarbons by pyrolysis, and the production of hydrocyanic acid from ammonia and carbon monoxide, the fluid reactant stream being subjected to contact with the sub-divided

2 solid heat retentive and refractory material in the two-stage operation with reconditioning and heating of the solid material between the first and second stages of contact with the fluid reactant. Further, the arrangement may advantageously be used to effect a vis-breaking on a relatively heavy liquid hydrocarbon charge, with either a catalytic or inert heat carrying solid material, and cracking of the vaporized portion of the charge with the same solid material at a higher temperature.

It is a principal object of the present invention to provide a method for conducting the continuous conversion of a fluid reactant stream by two stages of contact with sub-divided solid contact material which is maintained in a continuous cyclic flow through the unit, with the flow arrangement such that the fluid charge stream contacts used or partially cooled contact material in the first stage and freshly reconditioned or reactivated contact material at increased temperature in the second stage. It is also an object of the invention to provide a downward gravity movement of the contact material through adjacent contacting zones with the solid material being transferred from the lower zone for the high temperature conversion of the reactant stream to the upper zone for the reconditioning of the solid material through an elongated confined straight line path in the form of a vertical conduit or riser line wherein the first stage contact of the reactant stream is effected, thereby utilizing nearly the entire cyclic path of the solid material in a highly effective manner and reducing to an insignificant minimum those portions of the cyclic path which merely serve the transfer of solid material.

It is a further object of the invention to utilize the reactant charge stream for transferring the contact material from the reaction zone to an elevated separation zone, such that the charge is initially contacted with a partially cooled and relatively inactive or contaminated solid material, and subsequently contacted with freshly reactivated or reconditioned contact material, whereby a substantial portion of the heat still contained in the solid material discharged from the reaction zone is utilized for heating the incoming reactant charge and simultaneously therewith undesired components of the charge may be removed therefrom by the solid material and subsequently removed from the latter in the reconditioning or reactivation step, so that fluid reactant in preheated and preconditioned or purified state is brought into contact with the freshly reconditioned solid material.

Moreover, the invention aims at an improved system wherein the differential between the temperatures of the streams of gasiform reactant and solid material entering the second processing contact stage, provided for performing the principal or final reaction, is kept at a minimum, thereby benefitting the uniformity of reaction. Further, the invention aims at a perfected overall thermal efficiency of the solids cycle and a highly economical heat conservation in the operation by practically completely eliminating solids passageways of appreciable lengths in between the various contact zones, by utilizing the necessary passageway required for lifting the solid material from the lowest to the highest level of the solids cycle as one of the principal contacting zones, and in the preferred form of execution by substantially enveloping the last-mentioned passageway in the other principal contacting zones.

Other objects and advantages of the improved flow method of this invention will be pointed out in the subsequent description. The general principles of the moving bed and fluidized operations, using sub-divided solid contact material, are now well-known to the chemical and petroleum arts and need not be described in detail herein. The particles are of course limited to a size suitable to permit a fluidized transfer from the lower end of the lower or enlarged reaction zone to the superimposed separation zone. Also, the particles are preferably spherical in form such that they readily flow by gravity and are not subjected to undue attrition during their cyclic movement in the processing unit.

In the continuous process for effecting reactions of fluid reactant streams at elevated temperatures in the presence of particulated solid material in accordance with the present invention a stream of hot solid particles obtained as hereinafter set forth is commingled with a fluid reactant stream of lower temperature, the commingled streams are passed upwardly through a confined vertically elongated straight-line path into an elevated separation zone and therein heated gasiform reactant is separated from the contacted particles, separated particles are passed from the separation zone by gravity flow into and downwardly through a confined upper contacting zone and therein the particles are heated to an increased temperature by contact with a reconditioning fluid stream, heated particles are passed from the upper contacting zone by gravity flow into and downwardly through a confined lower contacting zone, heated gasiform reactant is passed from the separation zone to the lower contacting zone and into contact therein at reaction temperature with the heated solid particles, resultant fluid conversion products are removed from the lower contacting zone while, separately, used reconditioning fluid is withdrawn from the upper contacting zone, a stream of solid particles is discharged by gravity flow from the lower portion of the lower contacting zone and this stream, while still in a hot condition, is commingled as the aforesaid stream of hot solid particles with the fluid reactant charge stream.

In a preferred embodiment, the present process comprises commingling a relatively cool fluid reactant stream with a stream of hot solid particles obtained as hereinafter set forth, passing the commingled streams upwardly in a confined vertically elongated straight-line path extending through a confined reaction zone and a superimposed confined reactivation zone into a more highly elevated confined separation zone and effecting an initial contact between the fluid reactant stream and the solid material and heating the former while transferring the latter to the elevated separation zone, separating heated reactant in vaporous or gaseous state from the contacted particles in the separation zone, passing separated particles from the separation zone by gravity flow into and downwardly through the reactivation zone and therein heating the solid particles to an increased temperature during contact with a stream of suitable reactivating fluid, passing heated particles by gravity flow into and downwardly through the reaction zone, passing separated gasiform reactant from the separation zone to the reaction zone and into contact therein at reaction temperature with the heated solid particles, withdrawing resulting conversion products from the reaction zone while separately withdrawing used reactivation fluid from the reactivation zone, discharging a stream of contacted solid material from the lower portion of the reaction zone and commingling the same while still in a hot condition as the aforesaid stream of hot solid particles with the fluid reactant charge stream.

In the conversion of organic reactants there is normally sufficient carbonaceous deposit formed on the solid material to permit its removal by a burning operation. Thus, normally an air or other oxygen-containing stream is introduced into the regenerating or reactivation zone to contact the solid material in a fluidized or countercurrent flow such that the entire stream of solid material flowing downwardly through this zone is mixed with and contacted by the oxygen-containing stream and the contaminating matter is oxidized and removed from the particles. The burning operation also raises the temperature of the solid material such that it passes in a reconditioned and heated state to the lower reaction zone. The burning and reactivation operation may be controlled in a manner to pass solid material at the desired temperature to the reaction zone, wherein the second stage of contact or the final reaction is effected under suitable conversion conditions to provide desired products.

Preferably, the lower reaction zone, the superimposed regeneration zone, and the more highly elevated separation zone are in vertical alignment with one another such that a vertical open-ended conduit may be positioned centrally with respect to each of the contacting zones and provide for the upward transfer of the used contacted particles in a straight-line path and in an enclosed zone which is in heat exchange relationship with each of the respective contacting zones, whereby there is a minimum of heat lost within the unit. The operation of the unit is continuous, the fluid charge stream being continuously introduced into the lower end of the unit at the bottom of the central riser conduit, and continuous streams and beds of solid particles being caused to pass in a gravity flow from the upper end of the unit to the lower, through each of the separate enlarged zones.

It is a particular advantage of the present operation to have an arrangement utilizing a fluid charge stream as the fluidizing and lifting medium, as well as effecting an initial contact between the solid material and the charge stream at a somewhat lower temperature than that maintained in the principal or final reaction zone. This latter feature is desirable in that it provides directly within the unit itself, means for vaporizing a liquid charge stream and preheating it to a desired high temperature preliminary to a more complete conversion, either catalytic or thermal, into desired products. Alternately, the initial contact with used reduced temperature solid material, permits a liquid charge stream or a gaseous stream to undergo a pretreating contact wherein a portion of the heavier or less desirable constituents and contaminants tend to be coked or decomposed so that they are removed with the aid of the contacted solid material and precluded from contaminating the removed more highly heated, freshly reconditioned solid particles.

In a more specific embodiment, the invention provides for the continuous catalytic conversion of a liquid hydrocarbon charge stream in a manner comprising, maintaining a downwardly moving compact bed of sub-divided catalytic material in each of a confined reaction zone, a confined regeneration zone superimposed above the reaction zone, and a confined separation zone superimposed above the regeneration zone and said zones being in vertical alignment with one another, withdrawing contacted catalyst particles, downwardly by gravity and without any substantial cooling from the lower portion of the reaction zone, mixing the liquid hydrocarbon charge stream of lower temperature with the thus withdrawn particles and passing the resulting mixture upwardly through a confined straight-line path extending vertically through the reaction and regeneration zones into the separation zone and discharging the same into an elevated portion of the separation zone, effecting a separation of resulting vaporous hydrocarbons from the solid material in the latter zone and passing a continuous stream of separated catalyst particles from the lower portion of the separation zone into the upper portion of the regeneration zone, introducing an oxygen-containing regenerating gas stream into the lower portion of the regeneration zone and countercurrently contacting it with the catalyst particles therein while the latter pass downwardly by gravity therethrough so that carbonaceous contaminating material is removed from these particles and the latter are reactivated and reheated, passing regenerated catalyst particles in a continuous stream from the lower portion of the regeneration zone by gravity into the upper portion of the lower reaction zone, passing vaporized hydrocarbons from the upper portion of the separation zone downwardly to the lower reaction zone and contacting them with the freshly regenerated catalyst particles therein at conversion conditions and at a temperature above the initial contact in the confined straight-line path, withdrawing resulting fluid conversion products from the reaction zone, and discharging the thusly contacted catalyst particles from the lower portion of the reaction zone to mix with the liquid hydrocarbon charge stream in the aforesaid manner, while separately withdrawing used regeneration gas from the upper portion of the regeneration zone.

The contact within the reaction zone may be such that the vapor or gas stream or so-called gasiform reactant stream passes concurrently with the solid particles descending as a relatively compact bed within the reaction zone and fluid conversion products, generally in the vaporous or gaseous state, are withdrawn at the lower portion thereof. Alternately, the separated gasiform reactant stream may be introduced from the separation zone into the lower portion of the reaction zone to countercurrently contact the solid particles descending therein either in a fluidized state or hindered settling or as a relatively compact moving bed, the resulting fluid conversion products being withdrawn from the upper portion of the reaction zone for transfer to suitable separating and fractionating equipment.

It is also within the scope of the present invention to utilize means for closely controlling the reactivation or reconditioning of the catalyst or other solid contact material within the regeneration zone, by means of suitable cooling or heating apparatus in connection therewith. For example, a catalyst cooler may be connected with the regeneration zone such that a separate stream of catalyst is continuously withdrawn from the bed, passed through the cooler and returned to the regeneration zone at a lower temperature after passing in heat exchange relationship with a fluid medium in turn passing through the cooler. On the other hand, a burner or heater may be attached directly to the regeneration chamber to introduce a hot gaseous stream into the descending bed of particles such that they may be raised to a higher temperature than that accomplished through oxidation and burning of contaminating carbonaceous matter on the particles themselves and permit the raising of the particles to a higher temperature, as may be required in certain conversion processes, particularly those wherein the conversion reactions are not accompanied by any, or any material, deposition of carbonaceous contaminants on the solid particles.

The accompanying drawing will serve to more clearly show a preferred apparatus arrangement suitable for effecting the improved contacting of sub-divided solid particles with a reactant stream, as well as additional advantageous features of the present invention.

Figure 1 of the drawing is an elevational diagrammatic view of one embodiment of the present invention.

Figure 2 of the drawing shows an alternate arrangement of the lower portion of the unit, namely at the reaction zone, whereby a concurrent flow of the heated gasiform reactant stream and the sub-divided solid material may be effected in a descending moving bed.

Referring now to the drawing, there is shown a lower reaction chamber 1, a superimposed regenerator 2, and a more highly elevated separation chamber 3, all of which are in vertical alignment. A central riser conduit 4 extends from the lower end of the chamber 1 through this chamber and the regenerator 2 into an elevated portion of the uppermost chamber 3. Conduit 4 has open ends and is suitable for transferring solid particles from the lower portion of the reaction chamber 1 into the elevated separation chamber 3 by means of a fluidizing stream entering the lower end of the conduit. In accordance with the present invention, the reactant charge stream is introduced through line 5, having control valve 6, pump 7 and line 8 into the lower end of the riser conduit 4, so that the fluid stream mixes with the solid particles descending in an annular column through the lower elongated well 9 of chamber 1, whereby they may be carried in a fluidized phase to the upper end of the unit. The charge stream entering through line 5 thus effects its first contact with the solid material as it passes upwardly through the riser conduit 4, the contact being with particles which have been used within the reaction chamber and which are therefore partially contaminated and of a lower temperature than those which originally enter the reaction chamber 1 from the regenerating chamber 2. However, in either a catalytic or strictly thermal operation, the particles normally have sufficient heat to vaporize a liquid charge where necessary and provide the elevation of the particles in a gaseous fluidizing stream to the elevated separation zone.

In the following description of the process and flow, it will be assumed that the solid material comprises finely divided catalyst particles, such as silica-alumina, or silica-magnesia microspheres suitable to convert a relatively heavy charge stream into a vaporous state and catalytically crack the stream into desired fractions. The catalyst for this purpose preferably is a synthetic composite essentially consisting of a major portion of silica and a minor portion of at least one of the oxides of aluminum, zirconium, and magnesium. Thus hydrocarbon vapors and used catalyst entering an elevated portion of the separation zone 3, are permitted to spread out into an enlarged area such that the solid particles descend into a relatively compact bed in the lower portion of the chamber and the resulting vapors pass upwardly into transfer line 10 and are supplied to the lower reaction chamber 1 through control valve 11, blower or pump 12, and line 13.

The contacted solid catalyst particles descend in a continuous stream through a line 14, valve 15, into the upper portion of a downwardly moving or fluidized bed 16, being maintained within the regeneration chamber 2. In accordance with a preferred embodiment of the present invention, the catalyst particles are of a relatively fine size suitable to easily aerate and transfer to the elevated separation zone. Fluidized contacting beds of catalyst may be maintained within each of the principal contacting zones 1 and 2 in the arrangement of Figure 1 of the drawing. An air or other regenerating gas stream containing free oxygen is introduced into the lower portion of the chamber 2 by way of line 17, having control valve 18 and passes continuously upwardly through the bed of solid particles in the lower portion of the chamber, whereby the solid material is countercurrently contacted while it travels downwardly in the form of a relatively compact bed or, preferably, in a hindered settling or fluidized state, with the resulting oxidation and removal of carbonaceous contaminating matter that has adhered to the catalyst particles. A sufficient quantity of oxygen or air is introduced into the regeneration zone to substantially remove all of the contaminating deposit on the catalyst particles and permit the withdrawal of reactivated and heated catalyst from the lower portion of the chamber 2. Preferably the particles are withdrawn in an annular column which descends through well 19, around the riser conduit 4, subsequently passing through line 20 and control valve 21 into the upper portion of the reaction chamber 1. Resulting flue gases are passed from the upper portion of the regeneration chamber 2 through a particle separator 22, which may be of an electrical, mechanical, or centrifugal type, suitable to separate entrained catalyst and collect and return it through a dip-leg 23 to the upper portion of the bed 16, within the lower portion of the chamber 2. Flue gases substantially clear of catalyst particles are discharged from the upper portion of the separator 22 by way of line 24, having control valve 25.

In the embodiment of Figure 1, means is provided in connection with the regenerator 2 for cooling the catalyst as it is regenerated and extracting useful heat therefrom, for the generation of steam or for any other desired heating operation. Particularly in an operation where a liquid charge of a heavy hydrocarbon oil is introduced to the unit, there will tend to be a relatively heavy carbonaceous deposit on the catalyst as it descends from the vapor separator 3 into the regeneration chamber and a substantially large amount of coke is necessarily burned and removed from the catalyst in the regenerator. In order to control the regenerating temperature, so that the catalyst particles are not excessively heated and deactivated by high temperature conditions, the particles may, if desired, be circulated through a catalyst cooler 26 by withdrawing a continuous stream of the particles through line 27, valve 28, and riser line 29. The particles pass upwardly through the cooler 26 in heat exchange relationship with a fluid stream entering the shell of the heat exchanger by way of line 30 and being discharged therefrom through line 31. The cooled catalyst stream is returned to the upper portion of the catalyst bed in regenerator 2 through a return line 32. In order to provide convenient means for fluidizing and carrying the catalyst particle stream upwardly through the cooler 26, a portion of the flue gas stream passing through line 24 may be withdrawn by way of line 33, having valve 34, and forced by a suitable blower or pump 35 into line 29 having control valve 36. Provision is also made for passing a portion of the flue gases into the lower end of the withdrawal well 19, such that the flue gas, particularly when it is substantially free of oxygen, may act as a hot stripping medium on the reactivated catalyst particles being passed downwardly through the well into the transfer line 20. A line 37, having valve 38, provides means for passing a portion of the flue gas stream from line 29 into the lower end of the well 19. Other suitable hot stripping fluid, for example superheated steam, however, may be supplied to line 37 instead of the hot flue gas, if so desired.

In the lower reaction chamber 1, a second stage of contact is effected between the gasiform reactant stream and catalyst particles; in other words, the resulting gaseous or vaporous reactant stream being introduced into the lower portion of reactor 1 by way of line 13 passes upwardly through the chamber and preferably contacts the catalyst in a fluidized bed, with the stream uniformly mixing with and contacting the particles at suitable conditions of time and temperature for converting the reactant stream to desired products. The top of the particle bed is indicated by the broken line 39. Catalyst temperature is regulated by the regenerating and reactivation operation in chamber 2 and contact times, volumes, and so forth, are suitably regulated by controlling the flow of the reactant and catalyst streams to the reaction zone, in accordance with the particular process. The fluid conversion products pass through a particle separator 40, such that entrained particles are separated, collected and returned through a dip-leg 41 to the contact bed 39 in the lower portion of the chamber and a substantially particle-free product stream is passed from the chamber through line 42, having control valve 43. The product stream may be subsequently passed to suitable separating and fractionating equipment for recovery of the desired valuable products.

The improved contacting operation of this invention is not intended to be limited to any particular conversion reaction, for, as hereinbefore noted, it is advantageously used for various catalytic and pyrolytic reactions. It may be applied not only to the catalytic cracking of a hydrocarbon charge, which may be supplied either as a liquid or a vaporous charge stream or as a mixture of both, but also to dehydrogenation treatments wherein saturated hydrocarbons are converted to olefins or other desirable more valuable lower boiling products. The process may also be used for catalytically cracking and reforming a relatively light refractory hydrocarbon oil stock to produce high octane gasoline. Moreover, the processing arrangement is particularly adapted to provide a two-stage hydrocarbon oil treating and conversion operation wherein a relatively heavy stock is charged to the unit and subjected to a viscosity breaking or gas oil-producing treatment in the first contact stage followed by catalytic cracking of the gas oil fractions at higher temperatures within the second contact stage, namely the reaction chamber.

The apparatus arrangement and the flow process of the present invention is also adapted for handling substantially inert solid materials which are of a refractory nature suitable to transfer heat and thermally convert a fluid reactant stream into desired products. For example, the unit may well be used to thermally convert a saturated hydrocarbon reactant stream into olefinic products, the charge stream being preheated as it passes upwardly through the riser conduit 4 and resulting vapors being cracked in the lower reaction chamber 1 at a high temperature and short contact time to effect the production of desired lower molecular weight products. The solid particles may be made of such refractory materials as aluminum oxide, corundum, silica, silicon carbide (known as carborundum), zirconia, or composites of two or more of these materials, or they may be made of high-melting point metals or metal alloys, such as nickel and nickel alloys. It will be noted from Figure 1, that a burner 44 may be connected with the regeneration chamber 2 such that where the temperature produced by the burning and removal of contaminating deposits from the particles is insufficient to provide the desired temperature for the endothermic heat of reaction in the lower reaction chamber, then additional heat may be supplied by fuel and air introduced through burner 44 to the bed of solid particles descending through chamber 2. Lines 45 and 46, connecting with burner 44, may be used to supply fuel and air respectively to the burner and thus generate high temperature combustion gases for contacting the solid particles in chamber 2.

The apparatus arrangement in the embodiment of Figure 1, having the chambers in vertical alignment, is such that the improved process is thermally efficient and has a desirable flexibility of operation. The straight and vertical conduit 4 permits a straight-line path for transferring the used particles to the separation zone, while the separated particles are permitted to flow directly downward, by gravity, through each of the contacting zones. The straight-line flow path not only eliminates erosion and attrition of particles, but in addition, the conduit 4 is almost entirely enclosed within the contacting chambers such that there is but little heat lost from the unit while making the transfer of particles from the lower reaction chamber 1 to the uppermost chamber 3. In other words, a direct heat exchange relationship exists between the center riser conduit 4 and the contact beds within each of the chambers, which materially contributes not only to the reduction of the temperature differential between the streams of heated gasiform reactant and reconditioned solid particles entering the reactor 1, but also to the highly desirable reduction of the temperature differential between the streams of solid particles entering and leaving the reconditioning chamber 2. If desired, each of the superimposed chambers may be supported by suitable legs or skirts from the next lower chamber, and expansion joints may be utilized between the chambers to absorb differential expansion between the conduit and the chambers. Bellows type expansion points 47, 48 and 49 are shown in conduit 4 to accommodate the differential expansions. These joints may be made of suitable alloy to withstand the temperatures and other conditions to which they are exposed during use. The joint 48 may be pressure-tightly affixed at one terminal periphery to the wall of the conduit 4 and at its opposite terminal periphery to the upper head or man hole cover (not shown) of the chamber 2. Slip joints or other forms of accommodating expansion may also be used in lieu of bellows joints, and it is not intended to limit the construction to any particular one of such means. Another alternate construction may utilize a flexible head at the top of chamber 2, such that an expansion joint may be eliminated inside that chamber.

Referring now to Figure 2 of the drawing, there is shown a reactor chamber 1', which is adapted to receive the vaporous reactant stream, by way of line 10', at the upper portion of the chamber and pass the vapor stream downwardly through the chamber concurrently with the catalyst particles as they descend in a gravity flow, and preferably as a relatively compact bed, to the lower end of the unit. A vapor distributing header 50 permits a distribution of the stream into the descending bed of particles. This alternate embodiment of the apparatus provides a more desirable flow for certain conversion processes, particularly those requiring a relatively short contact time between the reactant stream and the catalyst material. The portion of the processing unit, which is not shown in Figure 2, is substantially as shown in Figure 1 of the drawing. The reactant charge stream passes through line 5', valve 6', pump 7' and line 8', which in turn discharges into the lower end of the riser conduit 4', wherein contacted solid material descending from the lower portion of the chamber 1' through discharge well 9', becomes mixed with the reactant stream and is transferred to the separation chamber 3. Conduit 20', having control valve 21', provides means for introducing the regenerated catalyst material or reconditioned and reheated inert particles from the chamber 2 or the discharge well 19 into the top portion of the reactor chamber 1'. At the lower end of reactor chamber 1', there is provided an inverted baffle plate 51 or other means suitable to separate and discharge gaseous or vaporous conversion products from the descending particle bed. The conversion products pass through line 52 into a particle separating means 53, which may be of the centrifugal type as indicated, or alternately of a different mechanical or electrical type suitable to remove entrained particles from a gaseous or vaporous stream. Substantially clean gasiform conversion products pass from the separator 53 through line 61 and control valve 62 to suitable separating and fractionating means, which are not indicated. Removed solid particles are collected within the lower portion of the separator 53 and passed by way of line 54, having valve 55, to line 56, which in turn connects with line 6' and provides means for returning particles to the system. Line 57, having valve 58, provides means for introducing a gaseous medium such as steam or other relatively inert gas into line 56 and aid in transferring recovered solid particles to line 8'. Alternately, a valve 59 in line 56 and a valve 60 in an extension of line 54 provide means for discharging the solid material from the unit whenever it is undesirable to return the particles to the processing unit.

The embodiment of Figure 2 provides for an entire concurrent flow between the reactant stream and the solid particles, the initial stage of contacting being effected during concurrent upflow within the riser conduit 4', whereby to effect vaporization, purification or partial conversion of the reactant stream, while the second stage of contact at a higher temperature and at conditions providing a substantially complete conversion of the reactant stream to desired products is effected in a downward concurrent flow within the reactor 1'. Concurrent flow between the reactant stream and solid material is of advantage in various conversion processes, particularly in the cracking of hydrocarbons, and also is desirable when using catalyst or solid material particles which are of a large size and not as easily fluidized as a powdered or microspherical material. However, as noted hereinbefore, the particle size is necessarily limited to relatively small sizes such that the material may be elevated in a fluidized or "gas-lift" stream from the lower end of the unit to the elevated vapor separation zone without the requirement of excessively high velocities for the lifting fluid. For this reason, solid particles generally having diameters of less than 3 mm. are recommended, and particle sizes within the range of from 50 to 200 microns are preferred.

While the apparatus arrangements, which have been shown and described, are desired embodiments for effecting the improved flow in accordance with the present invention, it is not intended to limit the apparatus to the exact diagrammatic construction which has been shown. For example, the placement of additional expansion joints may be desired or they may be placed in alternate positions to those shown, as long as differential expansions are adequately taken care of to prevent rupture of the conduits. Expansion joints may also be placed in the particle down-flow transfer conduits where necessary, although not shown in the present drawing. The chambers 1, 2, 3 and 1' and the riser conduit 4 need not be dimensioned in the same proportions as shown. Also means other than a pump or blower 12, may be utilized in transferring the gasiform reactant stream from chamber 3 into the lower portion of the reactor chamber 1; in other words, an injector or eductor type of nozzle, utilizing an injection stream of steam or relatively inert gaseous or other fluid medium, such as for example a secondary gasiform reactant stream, may be utilized in lieu of the blower 12. Additional streams of stripping medium, steam, flue gas, or otherwise, may also be utilized at additional points in the unit, such as at the lower end of the withdrawal well 9, and at the lower end of the separating chamber 3, so that the discharged particle streams are substantially freed of occluded vaporous and gaseous materials prior to passing to the subsequent contacting zone.

I claim as my invention:

1. A continuous process for effecting reactions of fluid reactant streams at elevated temperatures in the presence of particulated solid material which comprises commingling a stream of hot solid particles obtained as hereinafter set forth with a fluid reactant stream of lower temperature, passing the commingled streams upwardly through a confined vertically elongated straight-line path into an elevated separation zone and therein separating heated gasiform reactant from the contacted particles, passing separated particles from said separation zone by gravity flow into and downwardly through a confined upper contacting zone disposed at a lower elevation than said separation zone and therein heating said particles to an increased temperature and burning combustible contaminants therefrom by contact with an oxygen-containing regeneration gas stream, passing heated particles from said upper contacting zone by gravity flow into and downwardly through a confined lower contacting zone disposed at a lower elevation than said upper contacting zone, passing heated gasiform reactant from said separation zone to said lower contacting zone and into contact therein at reaction temperature with the heated solid particles, withdrawing resultant fluid conversion products from said lower contacting zone while separately withdrawing used regeneration gas from said upper contacting zone, discharging a stream of contaminated solid particles by gravity flow from the lower portion of said lower contacting zone and commingling the same while still in a hot condition as said stream of hot solid particles with said fluid reactant stream.

2. The continuous process of claim 7 further characterized by maintaining the solid particles as a downwardly moving compact mass in each of the upper and lower contacting zones, passing the regeneration gas stream upwardly through the compact mass in said upper zone and passing the preheated gasiform reactant stream downwardly through the compact mass in said lower zone.

3. The continuous process of claim 7 further characterized by maintaining the solid particles as a downwardly moving compact mass in each of the upper and lower contacting zones and passing the regeneration gas stream in said upper zone and the preheated gasiform reactant stream in said lower zone upwardly through the compact mass therein.

4. A continuous process for the conversion of hydrocarbon reactants at elevated temperature in the presence of particulated solid contact material which comprises commingling a stream of hot particles of said solid material obtained as hereinafter set forth with a fluid hydrocarbon reactant stream of lower temperature, passing the commingled streams upwardly through a confined vertically elongated straight line path into an elevated separation zone and therein separating heated vaporous hydrocarbon reactant from the contacted particles, passing separated contacted particles from said separation zone by gravity flow into and downwardly through a confined regeneration zone disposed at a lower elevation than said separation zone and therein burning carbonaceous deposits from said particles by contact with an oxygen-containing regenerating gas stream, passing resultant regenerated particles of increased temperature from said regeneration zone by gravity flow into and downwardly through a confined reaction zone disposed at a lower elevation than said regeneration zone, passing heated vaporous hydrocarbon reactant from said separation zone to said reaction zone and into contact therein at conversion temperature with the regenerated solid particles thereby effecting conversion of said vaporous hydrocarbon reactant and depositing carbonaceous contaminants on said particles, withdrawing resultant fluid hydrocarbon conversion products from said reaction zone while separately withdrawing used regeneration gas from said regeneration zone, discharging a stream of contaminated solid particles by gravity flow from the lower portion of said reaction zone and commingling them while still in a hot condition as said stream of hot particles with said fluid hydrocarbon reactant stream.

5. The continuous process of claim 4 further characterized by commingling said stream of hot solid particles with a liquid hydrocarbon oil stream, vaporizing at least a major portion of said oil during its contact with said hot solid particles in the confined straight-line path and passing the vaporized hydrocarbons from the separation zone to the reaction zone and at cracking temperature therethrough.

6. The continuous process of claim 5 further characterized by maintaining the solid particles of contact material as a downwardly moving compact mass in the reaction zone and passing the vaporized hydrocarbons from the separation zone downwardly through said compact mass in said reaction zone.

7. A continuous process for contacting sub-divided solid material at elevated temperatures with a fluid reactant stream which comprises, commingling a relatively cool fluid reactant stream with a stream of hot solid particles obtained as hereinafter set forth, passing the commingled streams upwardly in a confined vertically elongated straight-line path extending through a confined lower contacting zone and a superimposed confined upper contacting zone into a more highly elevated confined separation zone and thereby effecting an initial concurrent contact between said reactant stream and said solid particles and heating the former, separating heated gasiform reactant from the solid particles in said separation zone, passing separated solid particles by gravity flow from said separation zone into and downwardly through said upper zone and therein heating said particles to an increased temperature and burning combustible contaminants therefrom by contact with an oxygen-containing regeneration gas stream, passing heated particles from said upper zone by gravity flow into and downwardly through said lower zone, passing separated heated gasiform reactant from said separation zone to said lower zone and into contact therein at reaction temperature with the heated solid particles, withdrawing resultant fluid conversion products from said lower zone while separately withdrawing used regeneration gas from said upper zone, discharging a stream of contaminated solid particles from the lower portion of said lower zone and commingling the same while still in a hot condition as said stream of hot solid particles with said fluid reactant stream.

8. A continuous process for contacting sub-divided solid material at elevated temperatures with a hydrocarbon reactant stream which comprises commingling a relatively cool hydrocarbon reactant stream with a stream of hot particles of said solid material obtained as hereinafter set forth, passing the commingled streams upwardly in a confined vertically elongated straight-line path extending through a confined reaction zone and a superimposed confined reactivation zone into a more highly elevated confined separation zone and thereby effecting an initial concurrent contact between said hydrocarbon stream and said solid material and heating the former, separating resulting heated vaporous hydrocarbons from the contacted solid particles in said separation zone, passing separated particles from said separation zone by gravity flow into and downwardly through said reactivation zone and therein burning carbonaceous deposits from said particles by contact with an oxygen-containing gas stream and increasing the temperature of said particles, passing resultant heated particles from said reactivation zone by gravity flow into and downwardly through said reaction zone, passing heated vaporous hydrocarbons from said separation zone to said reaction zone and into contact therein at conversion temperature with the regenerated solid particles thereby effecting conversion of said vaporous hydrocarbons and depositing carbonaceous contaminants on said particles, withdrawing resulting fluid hydrocarbon conversion products from said reaction zone while separately withdrawing used regeneration gas from said reactivation zone, discharging a stream of contaminated solid particles by gravity flow from the lower portion of said reaction zone and commingling the same while still in a hot condition as said stream of hot particles with said hydrocarbon reactant stream.

9. The continuous process of claim 8 further characterized in that said hydrocarbon reactant stream commingled with said stream of hot particles is a hydrocarbon oil and is charged to the commingling step in the liquid phase, at least a major portion of said oil is vaporized during its contact with said hot particles in the confined straight line path, and the separated vaporized hydrocarbons supplied from the separation zone to the reaction zone are therein subjected to cracking during contact with the heated solid particles.

10. The continuous process of claim 8 further characterized in that the solid particles are maintained as a downwardly moving compact mass in the reaction zone and the separated heated vaporous hydrocarbons are passed from the separation zone into and downwardly through said compact mass in said reaction zone.

11. The continuous process of claim 8 further characterized in that said sub-divided solid material comprises a cracking catalyst essentially consisting of a major portion of silica and a minor portion of at least one of the oxides of aluminum, zirconium and magnesium, and said hydrocarbon reactant stream comprises normally liquid hydrocarbons and is subjected to cracking into lower boiling hydrocarbons.

12. A method for contacting sub-divided solid contact material with a hydrocarbon reactant in a continuous conversion process which comprises commingling a relatively cool stream of said hydrocarbon reactant with a stream of hot particles of said solid material obtained as hereinafter set forth, passing the commingled streams upwardly in a confined straight-line path extending through a confined reaction zone and a superimposed confined reactivation zone into a more highly elevated confined separation zone and thereby effecting an initial concurrent contact between said hydrocarbon stream and said solid material and heating the former, separating resulting heated vaporous hydrocarbons from the solid contact material in said separation zone, passing the separated solid material by gravity flow into and downwardly through said reactivation zone, contacting said solid material therein with a reactivating gas stream to increase the temperature of said solid material and remove contaminating matter therefrom, passing reactivated and heated solid material from said reactivation zone by gravity into and downwardly through said reaction zone, passing separated heated vaporous hydrocarbons from said separation zone to the lower portion of said lower reaction zone and therein effecting a higher temperature countercurrent contact with the reactivated solid material therein, withdrawing resulting fluid hydrocarbon conversion products from the upper portion of said reaction zone while separately withdrawing used reactivation gas from said reactivation zone, discharging a stream of contaminated solid material from the lower portion of said reaction zone and commingling the same while still in a hot condition as said stream of hot particles with said relatively cool stream of hydrocarbon reactant.

13. The method of claim 12 further characterized in that said relatively cool hydrocarbon reactant stream is charged in the liquid phase to the commingling step and is at least largely vaporized in said confined straight-line path while said sub-divided solid material comprises a catalyst suitable to convert said separated heated vaporous hydrocarbons into lower boiling conversion products.

14. The method of claim 12 further characterized in that said relatively cool hydrocarbon reactant stream is a heavy hydrocarbon oil stream which is charged in the liquid phase to the commingling step and is largely vaporized in said confined straight-line path, said sub-divided solid material comprises a cracking catalyst essentially consisting of a major portion of silica and a minor portion of at least one of the oxides of aluminum, zirconium and magnesium. and the separated heated vaporous hydrocarbons are subjected in said reaction zone to catalytic cracking into lower boiling conversion products.

15. A method for contacting sub-divided solid catalyst particles with a normally liquid hydrocarbon stream in a catalytic conversion process comprising, commingling said hydrocarbon stream in the liquid phase with hot catalyst obtained as hereinafter set forth, passing the commingled streams upwardly in a confined straight-line path, said path extending vertically and axially through a confined lower reaction zone and a superimposed confined regeneration zone into a more highly elevated confined separation zone, effecting an initial concurrent contact between said hydrocarbon stream and said catalyst within said confined path, separating resulting vaporous hydrocarbons from said catalyst within said separation zone, passing the separated catalyst by gravity flow into and downwardly through said regeneration zone, introducing an oxygen-containing gas stream to the lower portion of said regeneration zone and therein burning contaminating matter from the catalyst particles and effecting a heating and reactivating of said catalyst, passing the separated vaporous hydrocarbons from the upper portion of said separation zone to the upper portion of said reaction zone, withdrawing reactivated catalyst particles from the lower portion of said regeneration zone in an annular column extending along said vertical confined path and passing them into the upper portion of said reaction zone, effecting a higher temperature concurrent contact between said vaporous hydrocarbons and the reactivated catalyst particles in a descending moving bed within said reaction zone, withdrawing resulting conversion products from the lower portion of said reaction zone and separately discharging contacted catalyst by gravity flow downwardly from the lower portion thereof in an annular column as said hot catalyst into said confined straight-line path, whereby said catalyst commingles with said liquid hydrocarbon stream and passes upwardly through said confined path in the aforesaid manner.

16. Apparatus for contacting sub-divided particles with a fluid stream in two stages, which comprises in combination, a lower contacting chamber, an upper contacting chamber, and a vapor separating chamber superimposed above said upper chamber, each of said chambers in vertical alignment with one another and with said vapor separating chamber and each chamber adapted to maintain a descending bed of solid particles, an open-ended conduit extending vertically from the lower portion of said lower chamber through each of said contacting chambers and through the lower portion of the vapor separating chamber, a fluid inlet extending into the lower end of said open-ended conduit, the latter being adapted to transfer particles from the lower portion of the lower contacting chamber to an elevated portion of the vapor separating chamber in a straight-line fluidized lift, at least one particle transfer conduit connecting the lower portion of the vapor separating chamber with said upper contacting chamber, and at least one other particle transfer conduit connecting the lower portion of the upper contacting chamber with said lower contacting chamber, a vapor conduit connecting the upper portion of said vapor separating chamber with said lower contacting chamber to transfer separated vapors to the latter, means for discharging a gas stream from the upper portion of said upper contacting chamber, and means for discharging a gasiform product stream from said lower contacting chamber.

17. The apparatus of claim 16 further characterized in that said vapor transfer conduit connects the upper portion of said vapor separating chamber with the upper portion of said lower contacting chamber whereby to permit concurrently downward travel of said vapors and particles through the latter, and vapor separating means within the lower portion of said lower contacting chamber connects with a product outlet from the lower portion of said lower chamber.

18. The apparatus of claim 16 further characterized in that said vapor separating chamber and each of said contacting chambers has an elongated lower portion circumscribing said open-ended conduit extending therethrough and forming thereby annular withdrawal wells, and said particle transfer conduits connect with the respective lower portions of the uppermost and intermediate one of said wells whereby particles are withdrawn in an annular column from each of said chambers.

FREDERICK W. LEFFER.

REFERENCES CITED

The following references are of record in the file of this patent:

UNITED STATES PATENTS

| Number | Name | Date |
|---|---|---|
| 2,437,222 | Crowley et al. | Mar. 2, 1948 |
| 2,463,623 | Huff | Mar. 8, 1949 |